(12) United States Patent
Gustafsson et al.

(10) Patent No.: US 7,956,622 B2
(45) Date of Patent: Jun. 7, 2011

(54) METHOD FOR SIGNAL PROCESSING OF CAPACITIVE MEASUREMENT SCALES

(75) Inventors: Carl-Erik Gustafsson, Eskilstuna (SE); Steve Tveit Pedersen, Oslo (NO); Svein Johannessen, Oslo (NO)

(73) Assignee: Hexagon Metrology AB, Nacka Strand (SE)

( * ) Notice: Subject to any disclaimer, the term of this patent is extended or adjusted under 35 U.S.C. 154(b) by 390 days.

(21) Appl. No.: 12/089,914

(22) PCT Filed: Oct. 3, 2006

(86) PCT No.: PCT/SE2006/050369
§ 371 (c)(1),
(2), (4) Date: May 30, 2008

(87) PCT Pub. No.: WO2007/043962
PCT Pub. Date: Apr. 19, 2007

(65) Prior Publication Data
US 2008/0300808 A1    Dec. 4, 2008

(30) Foreign Application Priority Data

Oct. 14, 2005 (SE) ........................................ 0502272

(51) Int. Cl.
*G01R 27/26* (2006.01)
(52) U.S. Cl. ............. 324/662; 341/33; 341/15; 324/686
(58) Field of Classification Search ................... 324/662
See application file for complete search history.

(56) References Cited

U.S. PATENT DOCUMENTS

| | | | | |
|---|---|---|---|---|
| 4,420,754 A * | 12/1983 | Andermo | ...................... | 324/660 |
| 5,077,635 A | 12/1991 | Bollhagen et al. | | |
| 5,178,018 A * | 1/1993 | Gill | ............................. | 73/861.28 |
| 5,394,096 A * | 2/1995 | Meyer | ............................ | 324/686 |
| 6,480,133 B2 * | 11/2002 | Kobayashi et al. | ............ | 341/156 |
| 7,196,527 B2 * | 3/2007 | Stridsberg | ...................... | 324/662 |
| 2003/0067308 A1 * | 4/2003 | Bonnell et al. | ................ | 324/662 |
| 2004/0027140 A1 * | 2/2004 | Fawcett | ......................... | 324/674 |
| 2004/0046548 A1 * | 3/2004 | Pettersson et al. | ........ | 324/207.17 |
| 2006/0071672 A1 * | 4/2006 | Tola et al. | ........................ | 324/662 |
| 2006/0077072 A1 * | 4/2006 | Tola et al. | ........................ | 341/15 |
| 2006/0097733 A1 * | 5/2006 | Roziere | .......................... | 324/662 |
| 2008/0024329 A1 * | 1/2008 | Mackey et al. | .................. | 341/33 |

FOREIGN PATENT DOCUMENTS

DE   37 11 062 A1   10/1988

* cited by examiner

*Primary Examiner* — Timothy J Dole
*Assistant Examiner* — Benjamin M Baldridge
(74) *Attorney, Agent, or Firm* — Young & Thompson

(57) ABSTRACT

A method for the signal processing of capacitive measurement scales intended for the measurement of lengths or angles, consisting of two parts moveable relative to each other provided with electrodes that together form condensers, whose magnitudes are variable and depend on the relative position as specified by a sinusoidal relationship between the two parts. The first part has n electrodes evenly distributed over one measurement period and the second part has one electrode per measurement period. The electrodes in the first part are fed with n alternating voltages whereby the time displacements of the alternating voltages relative to each other are $$\frac{t_0}{n},$$

, where $t_0$ is the length of the period of the alternating voltage. The electrode of the second mobile part captures a signal composed of one or several of the alternating voltages and the amplitude composition of the signal depends on the relative position between the two parts.

3 Claims, 5 Drawing Sheets

METHOD FOR SIGNAL PROCESSING OF CAPACITIVE MEASUREMENT SCALES

The invention describes a method for the measurement of amplitude relationships of an electrical signal that is composed of several signals of the same frequency with a constant time displacement between them, but where one or several of the component signals have a different amplitude or amplitudes.

The invention is primarily suitable for signal processing in capacitive measurement systems of the type that is described by the Swedish patent 7714010-1 and in applications of this patent (Swedish patents 9202005-6, 8604337-9 and 0003110-4).

The invention intends to achieve a simple signal processing unit that gives higher precision, higher resolution, more rapid updating and lower noise levels than signal processing units that have been used until now.

A capacitive measurement device of the type on which it is intended that the invention should be applied is described in the Swedish patent 7714010-1. Various applications that are based on the Swedish patent 7714010-1 are described in the Swedish patents 9202005-6, 8604337-9 and 0003110-4.

The patents listed above describe a system for the measurement of linear dimensions or angles based on the provision a first sensor part of at least three electrodes to which are fed electrical pulses that have a constant relative displacement in time, whereby the displacement in time of the output signal from a sensor electrode located on a second sensor part, hereafter referred to as the "composite signal", depends on the magnitude of the capacitive coupling with the previously mentioned measurement electrodes, and this displacement in time is used to detect the positions of the two sensor parts, that is, their relative positions.

The Swedish patent 7714010-1 describes a signal processing method in which the value of position is extracted from the information-carrying composite signal of the detection electrode through the measurement of time in a binary counter that functions synchronously with the measurement signals. This is achieved by allowing the zeroes of the composite signal (the lowermost signal in FIG. 1a) to control a locking circuit that preserves the condition of the binary counter at the zeroes.

Signals with sine-wave form (such as those shown in FIG. 1a) with a sufficiently good sine-wave form and the required precision of amplitude and stability of frequency are, however, difficult to produce, and they are, which is more important, expensive to produce.

Square-wave pulses (R, S and T in FIG. 1b) are therefore used instead of sine waves for the input signals in one preferred design. The composite signal will as a result of this be composed of square-wave signals with different displacements in time and amplitudes, and it will adopt a stepped appearance as is shown lowermost in FIG. 1b. When the position of the detection electrode is changed, however, the zeroes of the composite signal in this case do not change analogously with the changes in the capacitance: they are displaced stepwise by one quarter of a mechanical period. In order to achieve a more precise value of position, all overtones of the square-wave pulse must be filtered out from the composite signal, using an advanced bandpass filter. Only the sine-wave shaped fundamental tones of the input frequency remain after the filtering operation, and thus a sine-shaped composite signal is formed as shown in FIG. 1a. Calibration of the measurement system using a carefully defined standard is subsequently carried out in order to compensate for, among other things, shortcomings of the properties of the bandpass filter.

When square-wave signals are used as the input to capacitive measurement systems as described above, it is the amplitude composition of the composite signal that constitutes its positional information. According to the prior art technology described above, the positional information of the composite signal must be converted from the amplitude domain to the time domain. This takes place through the removal of all overtones from the composite signal with the aid of filtration. There are, however, several disadvantages associated with this.

Advanced and expensive bandpass filters are required in order to filter out all overtones. It is, furthermore, difficult to manufacture filters having exactly the same properties, and for this reason the filters cannot usually be exchanged with each other. This means that the measurement system must be recalibrated should it be necessary to exchange the filter unit.

The method using zeros of the wave is also sensitive for an offset in the composite signal, since the position of a zero is affected by any asymmetry present in the composite signal, relative to the zero-level potential.

The method using zeros of the wave is, furthermore, also sensitive for crosstalk, from, for example, the electronic circuits of the signal processing unit, which may give rise to transients in the filtered composite signal. If the time location of these transients lies close to the zero potential of the composite signal, an error may arise in the analysis of the zero.

A further disadvantage of the system described is that the frequency of the composite signal is not constant: it varies with the speed of relative motion between the two sensors parts as a result of the Doppler effect.

The composite signal and the reference signal have, for this reason, the same frequency only when the two electrode-bearing parts are stationary.

The change in frequency means that the period of "$t_{summa}$" for the zeroes of the composite signal when measuring during motion is either larger or smaller than that of the reference frequency, depending on the direction and speed of the motion. Since the counter frequency is constantly controlled by the frequency and the period "t" of the reference signal, a counter value that is either too low or too high is read.

A second effect of the variation with speed of the frequency of the composite signal is that the bandpass filter cannot be designed with as sharp a limit to the basic frequency of the reference signal as would be desirable—a certain bandwidth must be accepted due to the frequency variation. This means that the filtering cannot produce the perfect sine-wave form of the composite signal that is required for error-free detection of position.

It requires one complete period of the basic frequency of the reference signal in order to generate one measurement value, since the frequency of updating (the number of new measurements per second) is determined by the basic frequency of the reference signal.

The resolution of the measurement is determined by the frequency of the signal that is used in order to carry out the time determination. If it is desired to increase the measurement resolution it is therefore necessary either to reduce the basic frequency of the reference signal or to increase the frequency of the signal that is used to carry out the measurement of time.

The magnitude of the time delay is determined by the phase position of the bandpass filter and the basic frequency of the reference signal. The phase position of the bandpass filter is determined by the degree of filtering, which in turn depends on the noise conditions in the system. In order to reduce the time delay, it is possible to either reduce the degree of filtering or increase the measurement resolution through increasing the frequency of the signal that is used to carry out the measurement of time, or both.

The arguments presented above make it clear that it is difficult to achieve high precision of measurement and high frequency of updating while at the same time achieving a small delay in time.

A summary of the disadvantages of the prior art technology:

Advanced and expensive bandpass filters are required to filter out overtones in the composite signal.

It is difficult to manufacture identical filters.

The system is sensitive to offset, which affects the detection of the zero of the composite signal.

The system is sensitive to crosstalk, which affects the detection of the zero of the composite signal.

It is not possible to filter as much as desired, due to the Doppler effect, which affects the detection of the zero of the composite signal.

It is difficult to achieve high measurement resolution and high frequency of updating while at the same time achieving 1a small delay in time.

It is therefore one aim of the present invention to achieve a new method with which the disadvantages of the prior art technology described above can be eliminated.

One characteristic feature of the invention is that work is carried out in the amplitude domain of the composite signal ($v_o$ in FIG. 4), instead of, as previously, in its time domain, and this makes it unnecessary to convert between the amplitude domain and the time domain, and in this way the quality deterioration of the positional information of the composite signal is avoided.

The limitation in the updating rate of the conventional system, due to the fact that the time counter in this case must carry out a complete loop for each new measurement value, is also avoided. Signal processing units according to the invention can be designed also such that the A/D converter is electrically insulated from the capacitive sensor unit and from other electronic circuits of the signal processing during the actual A/D conversion. This ensures a low noise level and considerable insensitivity for external electrical disturbances.

One further advantage of the invention is that the electronic construction is significantly simpler and cheaper. Thus, no bandpass filters are required. It is also possible to omit the binary counters and the locking circuits and memory circuits associated with these. These are replaced by a relatively cheap signal processor. One major advantage of omitting the bandpass filter is that it is not possible to manufacture such filters with fully identical properties, as has already been mentioned. It has not been possible, therefore, to exchange these filters during service, and this has meant that it has been necessary to retune the measurement system when the filters are changed. All units designed according to the invention, in contrast, obtain identical properties and are fully exchangeable.

In summary, this means that the invention provides a more rapid, more precise and cheaper signal processing system with full exchangeability of the signal processing electronic circuits.

The invention will now be described as a non-limiting preferred design adapted for an electrode system in which the input signals that are applied to the transmitter electrodes are constituted by four symmetrical square-wave signals, mutually displaced from each other by a time displacement of one quarter period, where the lengths of the pulse, the gaps between pulses and the amplitudes are equal, and where the electrodes are designed in such a manner that the capacitance between transmitter electrodes and the receiver electrode varies according to a sine-wave function of the position (x).

The invention will now be described in more detail with the aid of the attached drawings, where FIGS. 1a and 1b show drawings of existing measurement systems principally based on the above-mentioned Swedish patent 7714010-1 mentioned above.

Figure 3:
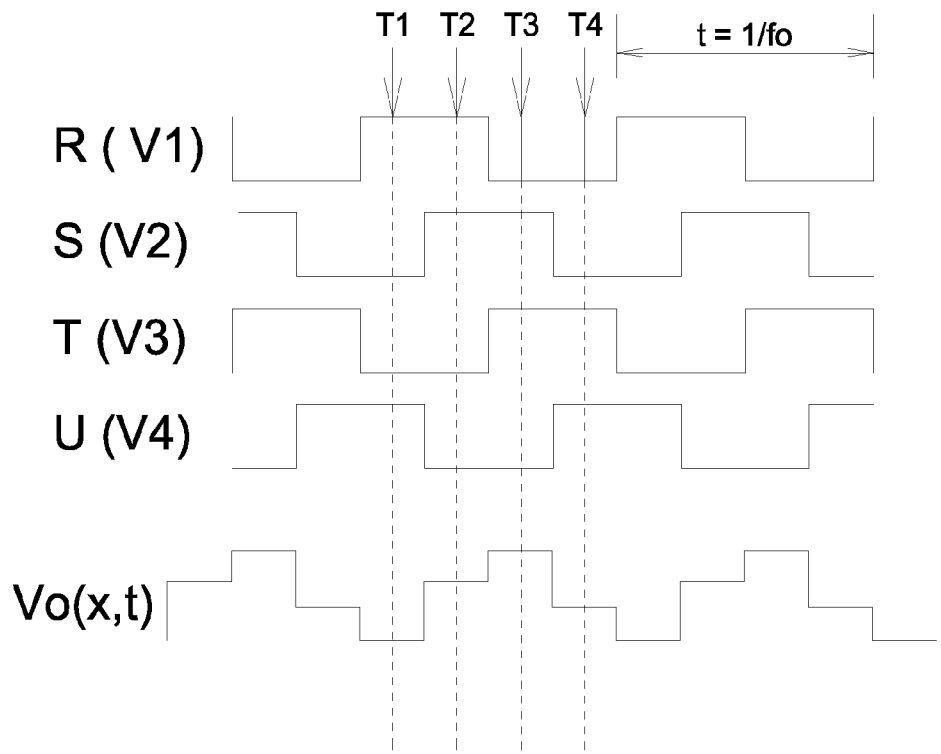

FIG. 3 shows examples of four measurement signals denoted R, S, T and U displaced in time, where S is displaced in time by one quarter of a period relative to R, T is displaced in time by one half of a period relative to R, and U is displaced in time by three quarters of a period relative to R. The times $T_1$, $T_2$, $T_3$, and $T_4$ at which amplitude measurements according to the invention are carried out are also shown in principle in the drawing.

Figure 4:
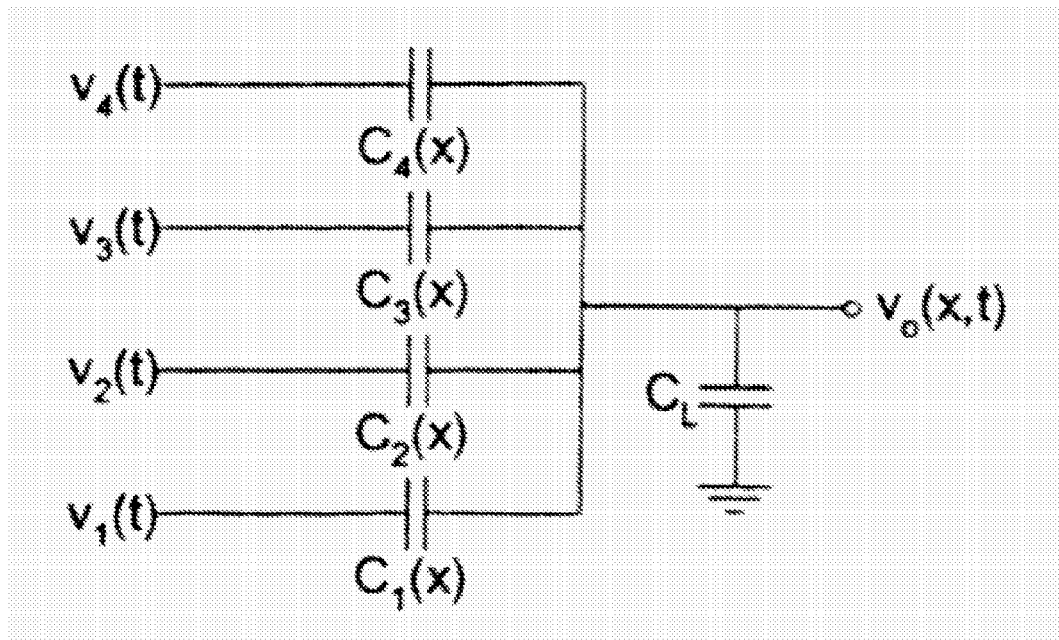

FIG. 4 shows a schematic drawing of the electrical properties of the capacitive measurement system.

Figure 5:
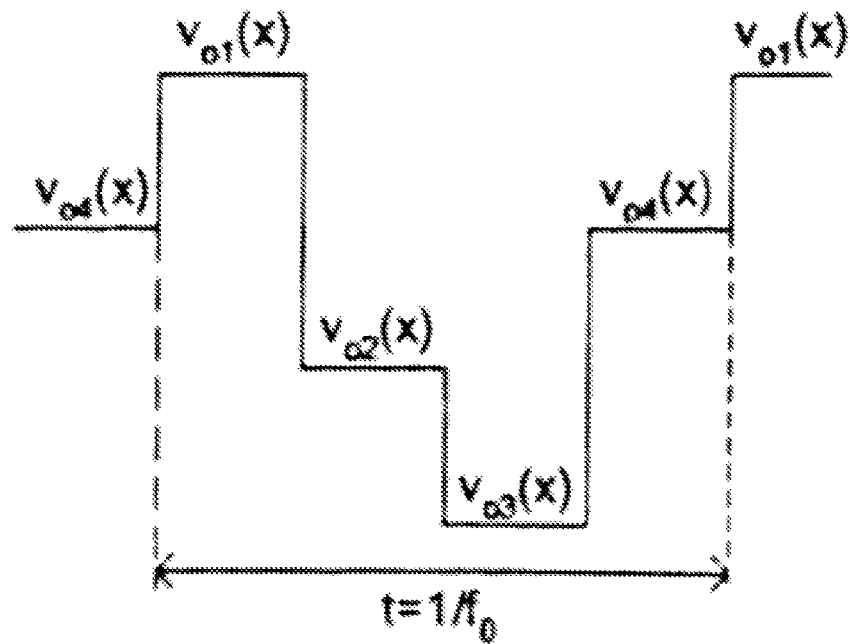

FIG. 5 shows a typical composite signal with differences in amplitude that contain information about the relative positions of the electrode systems.

Figure 6:
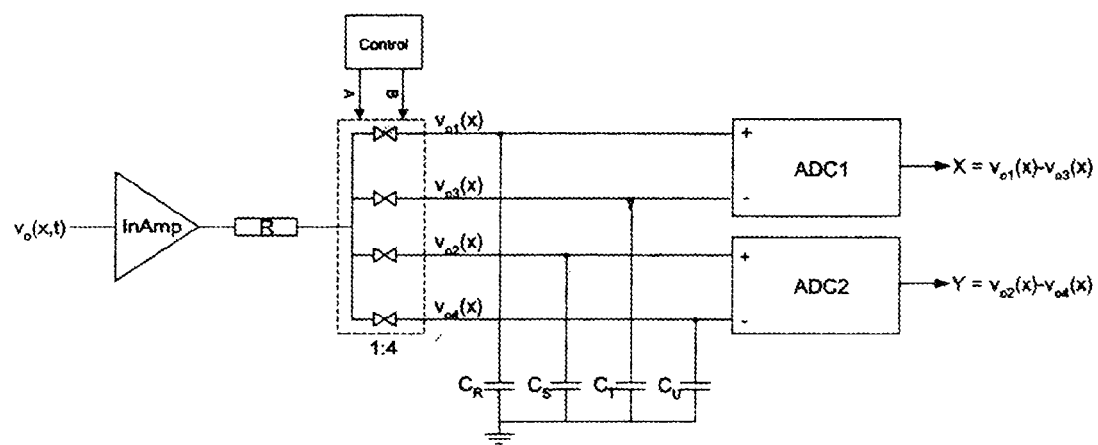

FIG. 6 shows schematically the function of a signal processing unit that uses the invention.

Figure 7:
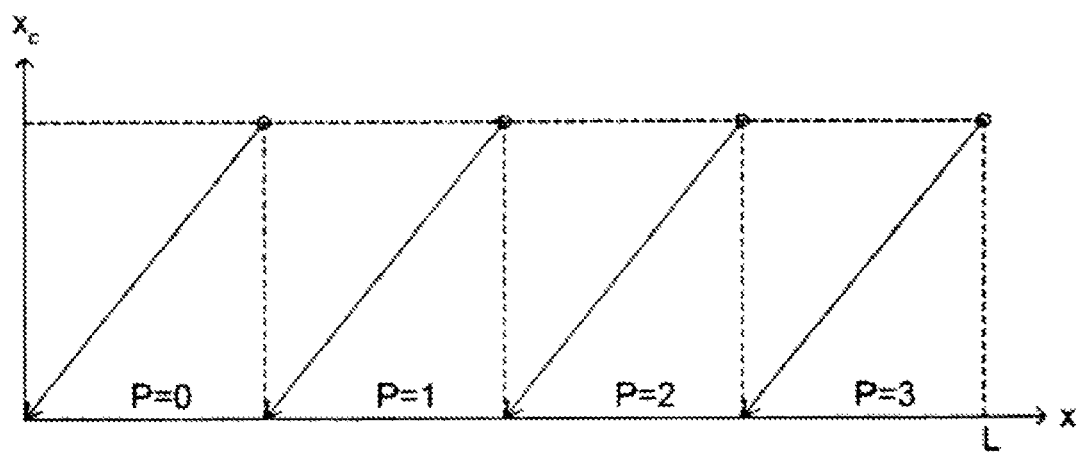

FIG. 7 shows how the length L of the mechanical period is built up from a number of separate steps in value that cover a length of one quarter of L.

The invention is intended to retrieve digital positional information from the output signal from a capacitive sensor of known type.

Figure 1A:
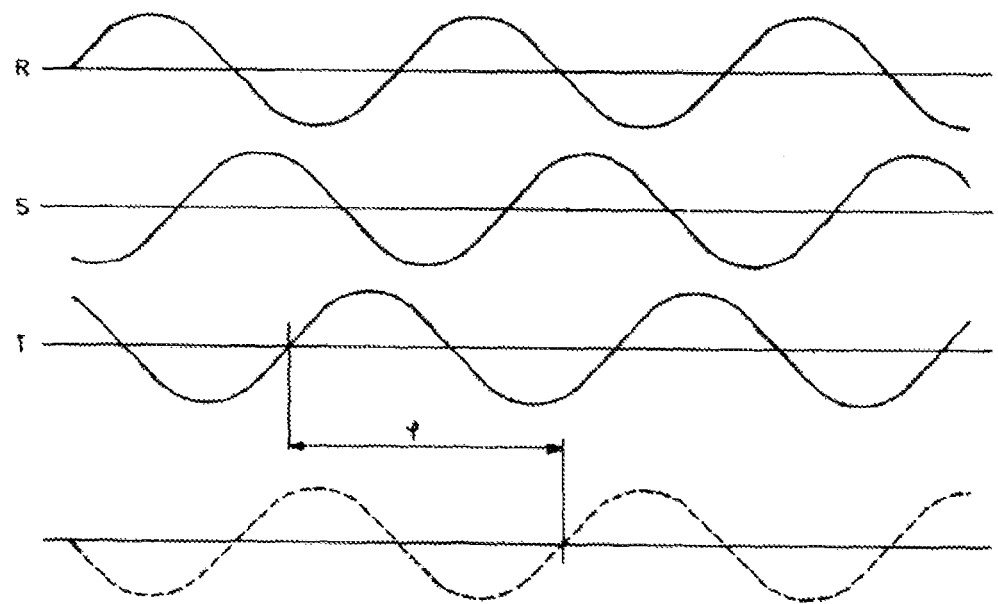
Figure 1B:
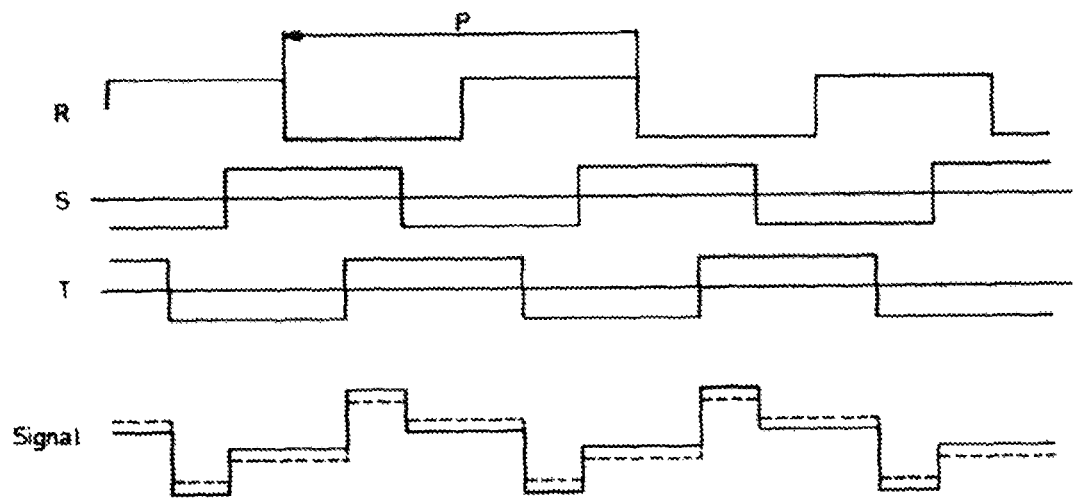
Figure 2A:
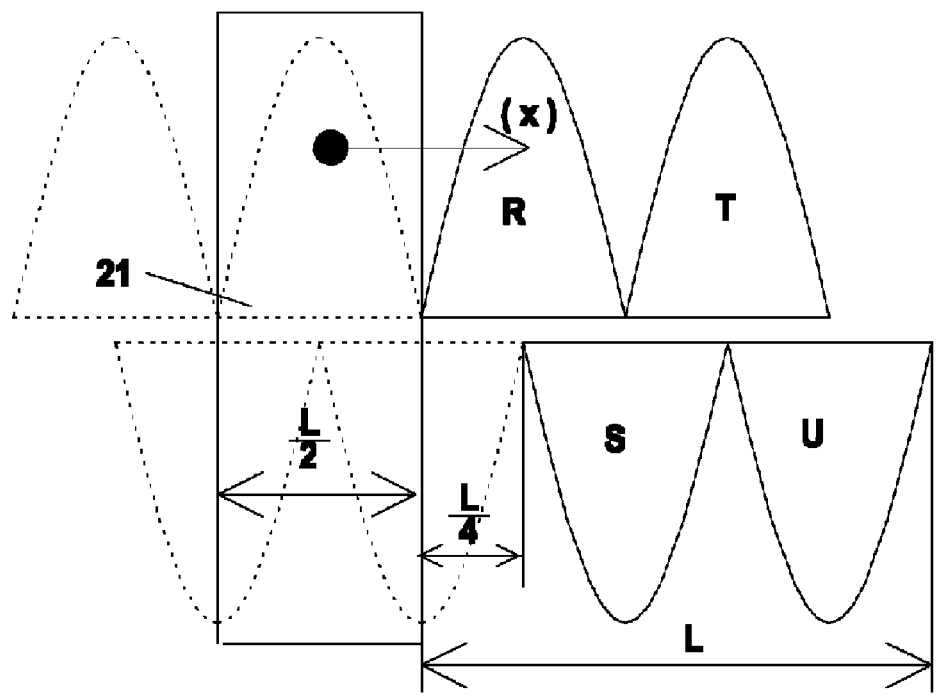
FIG. 2a shows an example of an electrode arrangement in which the invention can be applied.
Figure 2B:
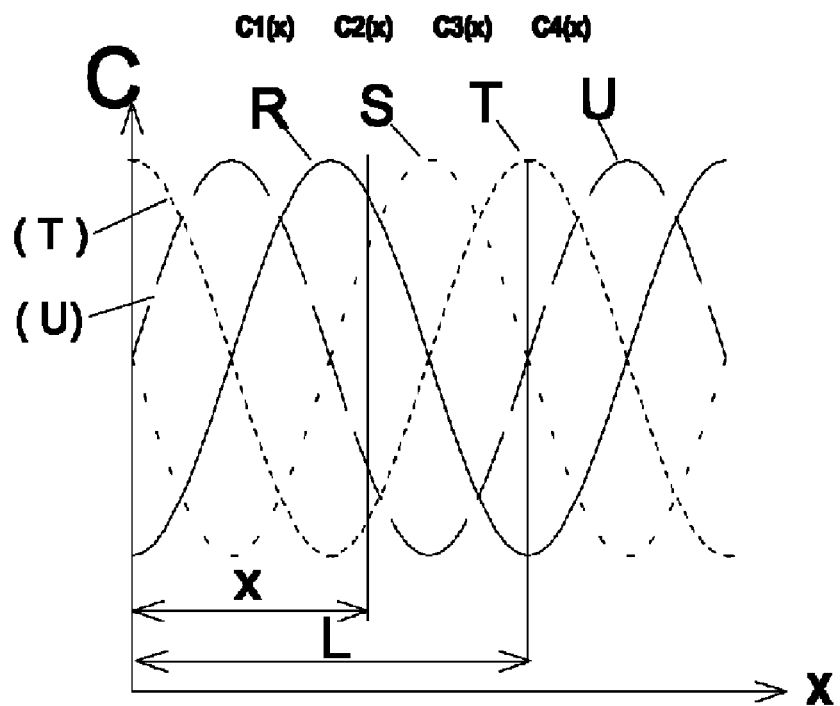
FIG. 2b shows the relationship between mechanical motion and capacitances in the sensor.

In brief, such a sensor functions as follows:

When the electrode 21 in FIG. 2a moves to the right, it will overlap to an increasing degree with the electrode R, whereby the magnitude of the overlapping area is a function of the position (x) of the electrode 21, which is shown with the continuous line R in FIG. 2b. The capacitance between the electrode 21 and the interacting electrode, which in this case is R, is thus directly proportional to the area of overlap.

The electrode 21 will subsequently overlap after this with electrodes S, T, and U in order, whereby the sizes of the areas of overlap are the functions S, T, and U in FIG. 2b.

Since the sensor comprises several periods of transmitter electrodes R, S, T and U, as is indicated by the dotted lines in the drawing, the surface interaction lines form continuous functions along the complete intended measurement area, as shown in FIG. 2b.

An input alternating voltage is applied to each of the transmitter electrodes R, S, T and U, which alternating voltages have a phase position (a displacement in time) that is unique for each transmitter electrode.

The intersection of the ordinate with the curves R, S, T, and U (FIG. 2b) at the position (x) shows the expected amplitude contribution from the corresponding input signal captured by the electrode 21.

We shall now show in more detail the theoretical relationship between the appearance of the composite signal and the relative positions between the receiver electrode 21 (FIG. 2a) and the transmitter electrodes R, S, T, U.

The signals R, S, T, U will be denoted hereafter as $v_1$, $v_2$, $v_3$ and $v_4$ in order to facilitate the presentation, and the capacitance functions that correspond to the interactions of the electrodes (R, S, T and U) with the receiver electrode 21 as $C_1(x)$, $C_2(x)$, $C_3(x)$ and $C_4(X)$.

FIG. 4 shows in principle and in a simplified manner the electrical circuit diagram for a capacitive sensor as specified by the Swedish patent 7714010-1, representing previously known technology.

The electrodes in the capacitive sensor are represented in the diagram as condensers. The capacitance of each condenser $C_1(x)$, $C_2(x)$, $C_3(x)$ and $C_4(x)$ is variable, and it thus varies as a function of the position (x) as shown in the drawing in FIG. 2b. This can be expressed as:

$$C_n(x) = \frac{\hat{C}}{2} \cdot \left(\sin\left(\frac{2\pi}{L}x + \theta_n\right) + 1\right),$$

$$\theta_n = (n-1)\frac{\pi}{2} \text{ where}$$

$$n = [1 \ldots 4]$$

where L is the mechanical length that corresponds to one period of the capacitance function (see FIG. 2b).

The input signals $v_1$, $v_2$, $v_3$ and $v_4$ that excite the capacitances may be, for example, periodic square-waves with frequency $f_0$, amplitude $\hat{v}$ and with 90-degree phase displacements relative to each other (FIG. 3). FIG. 3 shows also a composite signal $v_o(x, t)$ as it may appear at a certain randomly chosen value of (x) in FIG. 2b.

The input voltages can be written as:

$$v_n(t) = \hat{v}\,\text{sgn}\{\sin(2\pi f_0 t + \varphi_n)\},$$

$$\varphi_n = (n-1)\frac{\pi}{2} \text{ where}$$

$$n = [1 \ldots 4]$$

$$\text{sgn}(x) = \begin{cases} +1, & x \geq 0 \\ -1, & x < 0 \end{cases}$$

The composite signal $v_o(x, t)$ is loaded with a condenser $C_L$ to earth. The output signal from the sensor is a function of both the mechanical position (x) of the sensor and of time "t", and this signal is shown in more detail in FIG. 5. As the drawing makes clear, it is easy to identify the amplitude components for each individual transmitter electrode.

The output signal from the sensor can be written mathematically as:

$$v_o(x, t) = \frac{1}{C_L + \sum_{n=1}^{4} C_n(x)} \sum_{n=1}^{4} C_n(x) v_n(t)$$

As is made clear by FIG. 5, the output signal from the sensor consists of four different DC levels: $v_{o1}$, $v_{o2}$, $v_{o3}$ and $v_{o4}$. The magnitudes of these four DC levels are functions of the mechanical position (x) (FIG. 2b) in the sensor, and can be written as:

$$v_{o1}(x) = \frac{\hat{v} \cdot \hat{C}}{C_L + 2\hat{C}} \sqrt{2} \cos\left(\frac{(L-8x)\pi}{4L}\right)$$

$$v_{o2}(x) = -\frac{\hat{v} \cdot \hat{C}}{C_L + 2\hat{C}} \sqrt{2} \sin\left(\frac{(L-8x)\pi}{4L}\right)$$

-continued $$v_{o3}(x) = -\frac{\hat{v} \cdot \hat{C}}{C_L + 2\hat{C}} \sqrt{2} \cos\left(\frac{(L-8x)\pi}{4L}\right)$$

$$v_{o4}(x) = \frac{\hat{v} \cdot \hat{C}}{C_L + 2\hat{C}} \sqrt{2} \sin\left(\frac{(L-8x)\pi}{4L}\right)$$

We can see in the expressions for the four DC levels that the pairs $v_{o1}/v_{o3}$ and $v_{o2}/v_{o4}$ constitute a cosine function and a sine function, respectively, of the mechanical position (x) in the sensor. This relationship is used in the preferred design of the invention.

The description above and FIG. 3 make it clear that the summation of the signals results in a composite signal with four levels (FIG. 5), of which the two levels $v_{o3}$ and $v_{o4}$ are the inverses of the levels $v_{o1}$ and $v_{o2}$ (relative to the mean value of the composite signal).

The invention is based upon measurement of the four amplitude levels ($v_1$, $v_2$, $v_3$ and $v_4$) in the output signal ($v_o$) from the sensor, which levels, as we have shown above, are functions of the relative position (x) of the two electrode systems that move relative to each other.

The measurement is carried out at four different fixed times $T_1$, $T_2$, $T_3$ and $T_4$ evenly distributed throughout the period "$t=1/f_0$" of the input signal (FIG. 3).

The pairs $v_{o1}/v_{o3}$ and $v_{o2}/v_{o4}$ as we have previously shown, constitute a cosine function and a sine function, respectively, of the mechanical position (x) in the sensor.

The two component magnitudes of each pair, $v_{o1}/v_{o3}$ and $v_{o2}/v_{o4}$, are mirror images of each other relative to the mean value of the composite signal, which normally coincides with a potential of zero.

The result can be made independent of any zero offset present in the output signal of the sensor through digitalising the difference between $v_{o1}$ and $v_{o3}$, and that between $v_{o2}$ and $v_{o4}$.

The digitalised values are used for numerical calculation of the mechanical position of the sensor.

FIG. 6 shows a diagram of the principle of the electronic system.

The output signal $v_o$ from the sensor is amplified in the operational amplifier "InAmp" and filtered at the times $T_1$, $T_2$, $T_3$ and $T_4$ with the aid of a synchronous filter to the storage condensers $C_R$, $C_S$, $C_T$ and $C_U$, where the value is stored in the form of an electrical potential.

The synchronous filter consists of a resistor (R), the analogue 1-to-4 multiplexer (1:4 in FIG. 6) with its control circuits, and the condensers $C_R$, $C_S$, $C_T$ and $C_U$.

The synchronous filter controls the signal such that the DC level $v_{o1}$ is filtered and stored (it is sampled) in condenser $C_R$ (around the time $T_1$), the level $v_{o2}$ in $C_S$ (around $T_2$), the level $v_{o3}$ in $C_T$ (around $T_3$) and the level $v_{o4}$ in $C_U$ (around $T_4$).

After each filter and storage (sampling) operation of the DC levels in the storage condensers (around the times $T_1$, $T_2$, $T_3$ and $T_4$), the difference between $v_{o1}$ and $v_{o3}$ is digitalised (around the times $T_1$ and $T_3$ in the first A/D converter, ADC1), as is the difference between $v_{o2}$ and $v_{o4}$ (around the times $T_2$ and $T_4$ in the second A/D converter, ADC2).

$$X = v_{o1}(x) - v_{o3}(x)$$

$$Y = v_{o2}(x) - v_{o4}(x)$$

Furthermore, the filtering, storage (sampling) and the A/D conversion are controlled in such a manner that the storage condensers and ADC1 and ADC2 are electrically insulated from the input stage during the A/D conversion since the analogue 1-to-4 multiplexer (1:4 in FIG. 6) is not connected during the A/D conversion.

A large degree of immunity to disturbance and a low noise level in the digitalised measured values are achieved in this manner.

The mechanical position (x) of the sensor can then be calculated with the aid of the X and Y values. This can be carried out by, for example, applying the arctan function either to X/Y or to Y/X, depending of whether the absolute value of X is larger or smaller than the absolute value of Y.

The calculated position can be expressed as:

$$x_c = \begin{cases} \frac{L}{8\pi}\left[\pi - 4a\tan\left[\frac{Y}{X}\right]\right], & |X| > |Y| \\ \frac{L}{8\pi}\left[\pi + 4a\tan\left[\frac{X}{Y}\right]\right], & |X| \leq |Y| \end{cases}$$

A new calculation of the position is carried out each time a new measured value ($v_{o1}$, $v_{o2}$, $v_{o3}$ or $v_{o4}$) is stored in $C_R$, $C_S$, $C_T$ or $C_U$. Four calculations of position for each period "$t=1/f_0$" of the frequency of the input signal are obtained in this way (FIG. 3), which means a quadrupling of the updating frequency of the measurement system compared to the frequency of previous systems.

The value of (x) calculated in this manner covers an area that covers a quarter of the mechanical period L. Thus four such rounds of positional values are obtained in one mechanical period L, of magnitude from 0 to L/4 (FIG. 7).

It is possible to determine which quadrant of the period L the measurement has been taken (the function P in FIG. 7) by examining whether X or Y are positive or negative, depending on whether the absolute magnitude of X is greater or less than the absolute magnitude of Y. The system according to the invention will measure absolute values within one complete mechanical period L in this way.

$$P = \begin{cases} \begin{cases} 0, & X > 0 \\ 2, & X < 0 \end{cases}, & |X| > |Y| \\ \begin{cases} 1, & Y < 0 \\ 3, & Y > 0 \end{cases}, & |X| \leq |Y| \end{cases}$$

Once the value of (P) has been determined, the absolute position within the mechanical period L is obtained according to:

$$x = x_c + P\frac{L}{4},$$
$$P = [0, 1, 2, 3]$$

The A/D conversion is shown in FIG. 6 with the aid of two A/D converters ADC1 and ADC2 for reasons of clarity.

It is, in reality, advantageous to use instead only one A/D converter, whereby not only are cost advantages achieved but also errors are avoided that may arise from any differences between the properties of the two A/D converters "ADC1" and "ADC2". This is made possible by the use of a further multiplexer that connects the pairs $v_{o1}/v_{o3}$ and $v_{o2}/v_{o4}$ alternately to the inputs of the A/D converter.

The description given above is only an example of a suitable design of a signal-processing arrangement according to the invention.

Capacitive systems for measuring lengths and angles of the type described can be designed in a multitude of different ways. The geometry of the electrode, for example, can be designed in such a manner that the capacitance becomes a linear function of the motion, or a sine function, as it is in the preferred design, or another trigonometric function of the motion.

One skilled in the arts will realise also that the invention can be applied with the use of a freely chosen number of input signals n, where n>2. It will be realised also that the invention can be used with other relationships between capacitance and position than a sine-form, provided that the relationship can be described with a mathematical expression. It is also possible to use other relationships for the pulse width than those used in the described preferred design.

It will finally be realised also that signal processing according to the invention with suitable modifications will function also with sine-formed input signals.

The invention claimed is:

1. A method for the signal processing of capacitive measurement scales, comprising:
    measuring a plurality of lengths or angles between two parts of the capacitive measurement scales, the two parts moving relative to each other, each of the two parts provided with electrodes that together form condensers, the magnitudes of which are variable and depend on the relative position as specified by a sinusoidal relationship between the two parts moving relative to each other, wherein the first part has n electrodes evenly distributed over one mechanical measurement period and the second part has one electrode per mechanical measurement period, and that the electrodes in the first part are supplied with n alternating input voltages of the same frequency and the same amplitude, wherein the time differences of the said alternating voltages relative to each other are $t_o/n$, where $t_o$ is the length of the period of the said alternating voltage, whereby the electrode of the second mobile part captures in a capacitive manner a signal that comprises one or more of the said alternating voltages and where the amplitude of these signals depends on the relative position between the two parts;
    measuring the amplitude of each of the n signals in the electrodes of said second movable part; and
    storing separately the value for each of the n signals, wherein the relative position ($x_c$) is obtained through the algorithm:

$$x_c = \begin{cases} \frac{L}{8\pi}\left[\pi - 4\operatorname{atan}\left[\frac{Y}{X}\right]\right], & |X| > |Y| \\ \frac{L}{8\pi}\left[\pi + 4\operatorname{atan}\left[\frac{X}{Y}\right]\right], & |X| \leq |Y| \end{cases}.$$

2. A method for the signal processing of capacitive measurement scales, comprising:
    measuring a plurality of lengths or angles between two parts of the capacitive measurement scales, the two parts moving relative to each other, each of the two parts provided with electrodes that together form condensers, the magnitudes of which are variable and depend on the relative position as specified by a sinusoidal relationship between the two parts moving relative to each other, wherein the first part has n electrodes evenly distributed over one mechanical measurement period and the second part has one electrode per mechanical measurement period, and that the electrodes in the first part are supplied with n alternating input voltages of the same frequency and the same amplitude, wherein the time differences of the said alternating voltages relative to each other are $$\frac{t_0}{n},$$

where $t_o$ is the lenth of the period of the said alternating voltage, whereby the electrode of the second mobile part captures in a capacitive manner a signal that comprises one or more of the said alternating voltages and where the amplitude of these signals depends on the relative position between the two parts;

measuring the amplitude of each of the n signals in the electrodes of said second movable part; and storing separately the value for each of the n signals, wherein the digitalisation (digitization) and calculation of the relative position ($x_c$) is carried out n times per signal period, whereby the amplitude values used in the calculation are successively renewed by one sampling step for each calculation.

3. The method according to claim 2, wherein the number of input phases n is equal to four, and the A/D conversion is carried out with two A/D converters, one of which digitises the first and third amplitude values and the other of which digitises the second and fourth amplitude values.

* * * * *